Patented Feb. 20, 1934

1,947,652

UNITED STATES PATENT OFFICE 1,947,652

PROCESS FOR THE MANUFACTURE OF HEAVY METAL SALTS OF SULPHONIC ACID SOLUBLE IN MINERAL AND FATTY OILS AND THE PRODUCTS THEREOF

Siegfried Leonard Langedijk, Amsterdam, Netherlands, assignor to Naamlooze Vennootschap de Bataafsche Petroleum Maatschappij, The Hague, Netherlands No Drawing. Application November 18, 1929, Serial No. 408,176, and in the Netherlands November 20, 1928

16 Claims. (Cl. 260—11)

For various purposes, for instance as siccatives in the paint-industry and anti-fouling admixtures in paints and the like, serving to prevent the growth of organisms living in water against ships, fishing-nets, yarns, rigging, etc., certain products soluble in mineral as well as in fatty oils, are found useful.

For the extermination of insects, solutions of certain insecticides in petroleum and the like are being used, so that here, too, there is a demand for poisonous products soluble in mineral oils.

Now my invention enables the manufacture of a series of compounds, each of which in itself is readily soluble in mineral and fatty oils, whilst some are eminently suitable for application as siccatives in the paint-industry and others, in view of their poisonous properties, come into consideration for use as anti-fouling compositions and insecticides and as such can be used in solution in oil.

I have found that of the sulphonic acids formed in the sulphuric-acid refining of mineral oils previously treated with liquid sulphurous acid, those which remain in solution in the oil can be converted into heavy metal salts which easily dissolve in mineral and fatty oils.

Broadly speaking my invention consists in the conversion into the corresponding heavy metal salts of the sulphonic acids remaining in solution in the oil in the sulphuric acid refining of mineral or such like oils or oil products from which the constituents which are soluble in liquid sulphurous acid have been eliminated and the products thereof.

I will now proceed to describe a practical embodiment of the process according to my invention, but it should be understood that my invention is by no means restricted to this example, which merely serves as illustration.

In order to manufacture the desired metal salts I may proceed in the following way:

First I eliminate from a mineral oil or a mineral oil product or fraction, the constituents which are soluble in liquid sulphurous acid. This I may do in a known manner by acting on the said liquid with, for example, liquid sulphurous acid, furfurol and other compounds having a similar dissolving action on certain aromatic and, generally speaking, unsaturated hydrocarbon compounds. I next act on the remaining portion of the said liquid with a sulphonating agent such as, for example, sulphuric acid or oleum, whereby two layers, viz. an acid layer and an oil layer, are formed. Both layers contain sulphonic acids, but according to my invention I employ only those sulphonic acids which are formed in the oil layer.

To this end I may treat the oil, in which the desired sulphonic acids remain in solution after the sulphuric acid refining, once or several times with alcoholic alkali lye, whereby the sulphonic acids are precipitated as alkali-metal soaps. The sulphonic acids can be liberated therefrom by the addition of an acid. Now, in order to convert the sulphonic acids thus obtained into the corresponding heavy metal salts I prefer to add water and carefully neutralize with NaOH, thus obtaining a solution of sodium soaps. To this solution is added a solution of the corresponding heavy metal salt. The heavy metal soaps are thus precipitated as a pastelike mass. The aqueous liquid can be easily decanted; contingently the soaps can be absorbed in benzol, kerosene, benzine and the like, in which they are very easily dissolved and from which they can be subsequently obtained in a pure condition by evaporation of the solvent.

Alcohol is not suitable for this purpose in view of the soaps being far less readily soluble therein.

The corresponding heavy metal salts of the sulphonic acids can be made in the manner described with solutions of ferri-chloride, lead-acetate, cobalt nitrate, chromic alum, vanadium chloride, nickel nitrate, manganous sulphate, copper sulphate, etc.

In treating the oil with alcoholic lye it frequently occurs that with the soap there is removed a quantity of oil, which remains present under the precipitation of the sulphonic acids themselves and the manufacture of the metal salts. If it is desired to make the sulphonic acid salts oilfree, which is not always necessary for the object to be achieved, a separation of the constituents, for instance by washing with a liquid in which the oil is soluble and the soaps are not, can be easily brought about, and it is thus possible to obtain the soaps in a pure condition.

It was experimentally proved that heavy metal soaps obtained according to my invention are eminently suited for use as siccatives in the paint-industry. They are readily soluble in linseed oil. For paints that have to answer high requirements as to colour the manganous salts appeared to be excellently suited, as they do not or only very slightly affect the colour of the linseed oil. On the other hand the copper compounds will be preferably used in dark paints, as they strongly colour the linseed oil.

Further, the copper compounds may render good services as constituents of paints and the like destined to protect objects permanently submerged in water against the growth of organisms.

It should be understood that there are many more modes of application of the salts according to my invention and that in general they may be used as substitutes for any other technically applied metal soap.

Furthermore, my invention is by no means restricted to mineral oil fractions and products thereof as the initial material, it being applicable also, for instance, to oils obtained by hydration of brown coal and the like. The term "mineral oil liquid" employed in the claims is defined therefore as including all the materials just mentioned and others of like constituency and properties.

The term "oil" referred to in the specification and claims is intended to mean either mineral or vegetable oil.

What I claim is:—

1. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, and converting the sulphonic acids in said oil layer into heavy metal salts.

2. A process for the manufacture of heavy metal salts of sulphonic acids soluble in mineral and fatty oils comprising the steps of removing from a mineral oil the constituents soluble in liquid sulphur dioxide, sulphonating the residue, separating the oil layer from the acid layer of the sulphonated residue, converting the sulphonic acids in said oil layer into alkali metal sulphonates, and converting the alkali metal sulphonates into heavy metal sulphonates.

3. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, treating the sulphonic acids in said oil layer with an alcoholic lye to form an oily precipitate of alkali metal soaps, converting said oily precipitate by means of an acid into sulphonic acids, neutralizing said sulphonic acids in water with an alkali, and adding a heavy metal salt to the resulting alkali metal soaps to form the corresponding heavy metal salts.

4. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, and converting the sulphonic acids in said oil layer into manganese salts by treatment including reaction of said acids with manganese sulphate.

5. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, and converting the sulphonic acids in said oil layer into copper salts by treatment including reaction of said acids with copper sulphate.

6. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, and converting the sulphonic acids in said oil layer into lead salts by treatment including reaction of said acids with lead acetate.

7. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, treating the sulphonic acids in said oil layer with an alcoholic lye to form an oily precipitate of alkali metal soaps, converting said oily precipitate by means of an acid into sulphonic acids, neutralizing said sulphonic acids in water with an alkali and adding manganous sulphate to the resulting alkali metal soaps to form a manganese compound of the sulphonic acids.

8. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, treating the sulphonic acids in said oil layer with an alcoholic lye to form an oily precipitate of alkali metal soaps, converting said oily precipitate by means of an acid into sulphonic acids, neutralizing said sulphonic acids in water with an alkali and adding copper sulphate to the resulting alkali metal soaps to form a copper compound of the sulphonic acids.

9. A process for the manufacture of heavy metal salts of sulphonic acids, soluble in mineral and fatty oils, comprising the steps of removing from a mineral oil the constituents soluble in liquid sulphur dioxide, sulphonating the residue, separating the oil layer from the acid layer of the sulphonated residue, treating the sulphonic acids in said oil layer with an alcoholic lye to form an oily precipitate of alkali metal soaps, converting said oily precipitate by means of an acid into sulphonic acids, neutralizing said sulphonic acids in water with an alkali and adding lead acetate to the resulting alkali metal soaps to form a lead compound of the sulphonic acids.

10. The substance, an oil soluble heavy metal salt of those sulphonic acids which are extracted from the oil layer only of the product resulting from the sulphonation of a mineral oil from which the constituents soluble in liquid sulphur dioxide have previously been removed.

11. The substance, an oil soluble manganese salt of those sulphonic acids which are extracted from the oil layer only of the product resulting from the sulphonation of a mineral oil previously subjected to sulphurous acid purification.

12. The substance, an oil soluble copper salt of those sulphonic acids which are extracted from the oil layer only of the product resulting from the sulphonation of a mineral oil previously subjected to sulphurous acid purification.

13. The substance, an oil soluble lead salt of those sulphonic acids which are extracted from the oil layer only of the product resulting from the sulphonation of a mineral oil previously subjected to sulphurous acid purification.

14. An anti-fouling agent adapted to be used in solution in a paint oil consisting of a heavy metal salt, poisonous to marine incrustations, of those sulphonic acids which are extracted from the oil layer only of the product resulting from the sulphonation of a mineral oil previously subjected to sulphurous acid purification.

15. A paint drier consisting of a solution in a paint oil of a heavy metal salt of those sulphonic acids which are extracted from the oil layer only of the product resulting from the sulphonation of a mineral oil from which the constituents soluble in liquid sulphur dioxide have previously been removed.

16. An insecticide consisting of an oil solution of a poisonous heavy metal salt of those sulphonic acids which are extracted from the oil layer only of the product resulting from the sulphonation of a mineral oil from which the constituents soluble in liquid sulphur dioxide have previously been removed.

SIEGFRIED LEONARD LANGEDIJK.